United States Patent Office 2,709,188
Patented May 24, 1955

2,709,188

PROCESS FOR PREPARING CARBON FLUORIDES FROM CARBON AND A METAL FLUORIDE

Mark W. Farlow, Holly Oak, and Earl L. Muetterties, Hockessin, Del., assignors to E. I. du Pont de Nemours & Company, Wilmington, Del., a corporation of Delaware No Drawing. Application February 16, 1954, Serial No. 410,722

6 Claims. (Cl. 260—653)

This invention relates to the preparation of compounds of carbon with fluorine.

Compounds containing only carbon and fluorine (hereinafter referred to as fluorocarbons for the sake of brevity) possess considerable usefulness in many fields of applied chemistry. For example, they have demonstrated utility as dielectrics, intermediates for plastics, refrigerant liquids, ingredients of insecticidal compositions, e. g., as propellants, etc. However, the lack of economical syntheses of these compounds has hindered the development of more extensive markets for fluorocarbons.

This invention has as an object a new process for the preparation of fluorocarbons. Other objects will appear hereinafter.

These objects are accomplished by the present invention of a process wherein carbon is reacted at a temperature of at least 800° C., and preferably in an inert atmosphere, with a fluoride of a metal of atomic number of 26 to 29, inclusive, and the resultant fluorocarbons are isolated from the reaction. The metallic fluorides employed are those of iron, cobalt, nickel, and copper. They may be used singly or in admixture with one another. In the reaction they are the essential source of the fluorine in the resultant fluorocarbon composition.

The process of this invention is conveniently carried out by heating an intimate mixture of carbon and the metal fluoride in a suitable apparatus to a temperature of at least 800° C., and passing the gaseous reaction products through cold condensers to liquefy the fluorocarbons. If desired, a stream of inert gas such as nitrogen is passed through the reactor to help remove the gaseous reaction products. Another mode of operation consists in dropping the molten inorganic fluoride onto finely divided carbon heated to the reaction temperature in a suitable reactor or in subliming the inorganic fluoride over hot carbon. In still another embodiment, the inorganic fluoride is reacted with the carbon electrodes of a carbon arc, where the temperature is estimated to be in the range of 2500 to 3500-4000° C. This can be done, for example, by immersing the arc in the molten inorganic fluoride, or, if the fluoride is sufficiently volatile, by forcing its vapors through the carbon arc, which for this purpose might conveniently have one or both electrodes hollow.

The reaction temperature can be as high as can practically be obtained by known means. Extremely high temperatures, such as those that can be achieved by use of the carbon arc, are often desirable since, under such conditions, the reaction product may contain appreciable amounts of the valuable tetrafluoroethylene. With more conventional equipment, temperatures in the range of 800 to 1500° C., and preferably 900 to 1200° C., are suitable.

Any form of carbon, whether amorphous or crystalline, is suitable for the purpose of this invention. Thus, there can be used coal, graphite, charcoal, the various forms of carbon black such as lamp black, acetylene black, bone black, gas black, channel black, etc. At the lower temperatures, e. g., 800–1200° C., the best results are obtained with active carbon, of which many well-known varieties are available commercially. In general, active carbon is very finely divided, porous carbon having a total surface area of at least 20 square meters per gram (Hassler, "Active Carbon," Chemical Publishing Co., 1951, p. 127). When using the carbon arc, the activity or state of subdivision of the carbon is apparently of no consequence, but the carbon must, of course, possess sufficient conductivity. The carbon need not be rigorously pure and it may, for example, contain the normal amount of ash, e. g., from 0.5 to 4% by weight in the case of most active carbons.

The inorganic fluorides suitable for the purposes of this invention, i. e., the fluorides of iron, cobalt, nickel, and copper, can be prepared by methods described in the literature, and some of them are available commercially. Those fluorides which can be prepared without having resort to the use of free fluorine or halogen fluorides, i. e., iron, nickel, copper and cobalt II fluorides, are much more readily and economically accessible, and they are therefore preferred.

Both reactants, that is, the carbon and the metal fluoride, should preferably be substantially anhydrous, although the reaction can tolerate the presence of some water. Thus, those fluorides which normally contain water of crystallization should be dehydrated prior to use. It is also often desirable to dehydrate the carbon prior to reaction, since carbon, especially of the active or absorbent variety, can retain significant amounts of water even at high temperature.

While the relative proportions of the two reactants are not critical insofar as the course of the reaction is concerned, it is obviously desirable for economic reasons to have the carbon present in excess, in order to utilize as much as possible of the more expensive metal fluoride. Thus, it is preferred to use the two reactants in such proportions that there is present at least 0.25 gram atom, preferably between 1 and 5 gram atoms, of carbon per gram atom of fluoride. There can be used up to 20 gram atoms of carbon per gram atom of fluorine or even more.

The reaction usually gives a mixture of fluorocarbons, the preponderant component of which is in general carbon tetrafluoride, with lesser amounts of other fluorocarbons, e. g., the perfluorinated hydrocarbons from ethane to pentane. In addition, the crude reaction product may contain some unreacted inorganic fluoride, which can be recycled, and the free element whose fluoride was employed, or compounds thereof. The fluorocarbons can be isolated, for example, by passing the gaseous reaction mixture through cold condensers and fractionating the condensate through suitable distilling columns. If desired, the gaseous reaction product can be circulated through cold baffles to retain any material which is solid at that temperature, or it can be passed through liquid scrubbing solutions to separate the unchanged inorganic fluoride and the element formed during the reaction. It is usually desirable to effect rapid cooling of the reaction products to avoid side reactions or polymerizations at the high temperatures used.

The reaction can be carried out at any desired pressure, which is normally the atmospheric pressure but can be higher or lower.

The following examples in which parts are by weight are illustrative of the invention.

*Example I*

A horizontal nickel reaction tube fitted with inlet and outlet for gases and with a thermocouple well was charged with an intimate mixture of 20 parts of finely divided, anhydrous iron II fluoride and 25 parts of carbon black, the latter having previously been dried by heating at 1000° C. under an atmosphere of nitrogen. A glass collection system was attached to the exit end of the tube and the glass traps were cooled with liquid nitrogen. A slow stream of nitrogen was led through the reactor, which was heated to 1000° C. and held at that temperature for a period of two hours. The fluorocarbon condensate comprised chiefly carbon tetrafluoride, as indicated by infrared spectrographic analysis.

*Example II*

A mixture of 18 parts of anhydrous iron III fluoride and 12 parts of carbon black was reacted as described in Example I, except that the reaction was carried out at 900° C. for 1½ hours. Carbon tetrafluoride, identified by its infrared spectrum, was obtained in about 17% conversion.

*Example III*

A mixture of 15 parts of cobalt II fluoride and 10 parts of carbon black was reacted as described in Example I, except that the reaction was carried out at 1000–1100° C. for a period of one hour. The condensed fluorocarbons consisted primarily of carbon tetrafluoride, as shown by infrared spectrographic analysis.

*Example IV*

A graphite tube 20 cm. long was charged with 24 parts of carbon black and placed in the nickel reactor of Example I, which was heated to 900° C. for 15 hours in an atmosphere of nitrogen to dry the carbon black. After cooling, the carbon black was removed and mixed with 20 parts of anhydrous nickel fluoride, the mixture was charged in the graphite tube and the latter was placed again in the reactor. The reactor was carried out at 880° C. for 1½ hours in a slow stream of nitrogen. The condensed fluorocarbons consisted chiefly of carbon tetrafluoride, with lesser amounts of perfluoroethane, both materials being identified by their infrared spectra.

*Example V*

A mixture of 25 parts of anhydrous copper II fluoride and 18 parts of finely divided graphite was reacted by the procedure of Example I at a temperature of 922–1000° C. for a period of two hours and twenty minutes. Carbon tetrafluoride was obtained in about 40% conversion.

*Example VI*

In this example, iron III fluoride was reacted with the carbon electrodes of a carbon arc as follows: the cathode was a 5/16 inch graphite cylinder with a 3/16 inch core of iron III fluoride, mounted on a copper tube having perforations near the end holding the cathode to allow the product gases to escape. The anode was a 1/8 inch graphite cylinder with its end positioned nearly flush with the core of the cathode. The electrodes were mounted in a water-cooled, gas-tight glass jacket which was flushed with argon prior to operation and evacuated to a pressure of a few millimeters of mercury. The gaseous products left the reaction chamber through the perforations in the cathode holder, the latter being connected with a trap cooled with liquid nitrogen.

A direct current voltage of 21–22 volts was applied across the electrodes, the arc was struck by contacting the electrodes momentarily, and the electrode gap was adjusted to produce a current of 18–20 amperes. The pressure in the reaction chamber was 8 mm. of mercury. A total of 0.41 g. of iron III fluoride was consumed during the operation which produced 0.13 g. of gaseous products. Infrared spectroscopic analysis showed that the conversion to flurocarbons was about 22%, and that the fluorocarbons consisted of carbon tetrafluoride, tetrafluoroethylene and hexafluoroethane, these three products being present in the molar proportions of 47.5%, 47.5%, and 5%, respectively.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows.

I claim:

1. A process for the preparation of fluorocarbons wherein carbon is reacted at a temperature of at least 800° C., with, as the essential fluorine source, a fluoride of a metal of atomic number from 26 to 29, inclusive, and the resulting fluorocarbon composition is isolated.

2. A process for the preparation of fluorocarbons wherein carbon is reacted at a temperature of at least 800° C. with, as the essential fluorine source, a metallic fluoride of the class consisting of iron, nickel, copper, and cobalt II fluorides and the resulting fluorocarbon composition is isolated.

3. A process for the preparation of fluorocarbons wherein carbon is reacted, in an inert atmosphere and at a temperature of at least 800° C. with, as the essential fluorine source, a fluoride of a metal of atomic number from 26 to 29, inclusive, and the resulting fluorocarbon composition is isolated.

4. A process for the preparation of fluorocarbons wherein a fluoride of a metal of atomic number from 26 to 29, inclusive, is reacted with the carbon electrodes of a carbon arc.

5. The process for the preparation of tetrafluoroethylene wherein carbon is reacted at a temperature of at least 2500° C. with, as the essential fluorine source, a fluoride of a metal of atomic number from 26 to 29, inclusive, and the resulting tetrafluoroethylene is isolated.

6. The process of claim 1 wherein carbon is reacted, at a temperature of at least 2500° C., with the metal fluoride, the reaction products are rapidly cooled, and the resulting tetrafluoroethylene is isolated.

References Cited in the file of this patent

UNITED STATES PATENTS

| | | |
|---|---|---|
| 889,098 | Blackmore | May 26, 1909 |
| 1,861,625 | Driggs et al. | June 7, 1932 |
| 2,456,027 | Simons | Dec. 14, 1948 |
| 2,670,389 | Passino et al. | Feb. 23, 1954 |

OTHER REFERENCES

Allmand: Principles of Applied Electrochemistry, page 528 (1924).